United States Patent
Sasaki et al.

(10) Patent No.: US 8,994,322 B2
(45) Date of Patent: Mar. 31, 2015

(54) SECONDARY BATTERY SYSTEM

(75) Inventors: Hironori Sasaki, Hitachinaka (JP);
Tsunenori Yamamoto, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 354 days.

(21) Appl. No.: 13/535,410

(22) Filed: Jun. 28, 2012

(65) Prior Publication Data

US 2013/0002194 A1 Jan. 3, 2013

(30) Foreign Application Priority Data

Jun. 29, 2011 (JP) ................. 2011-143722

(51) Int. Cl.
| | | |
|---|---|---|
| *H02J 7/00* | (2006.01) | |
| *H01M 10/44* | (2006.01) | |
| *H01M 10/48* | (2006.01) | |
| *H01M 10/42* | (2006.01) | |

(52) U.S. Cl.
CPC ............... *H01M 10/425* (2013.01); *H02J 7/00* (2013.01); *H01M 10/4257* (2013.01); *H01M 10/44* (2013.01); *H01M 10/443* (2013.01); *H01M 10/48* (2013.01); *H01M 10/486* (2013.01)
USPC ........... 320/107; 320/128; 320/132; 320/153; 323/353; 323/371

(58) Field of Classification Search
CPC ... H02J 7/00; H01M 10/425; H01M 10/4257; H01M 10/44; H01M 10/443; H01M 10/48; H01M 10/486
USPC ........... 320/107, 128, 132, 153; 323/353, 371
See application file for complete search history.

(56) References Cited

U.S. PATENT DOCUMENTS

| | | | |
|---|---|---|---|
| 5,132,626 A | 7/1992 | Limuti et al. | |
| 5,307,001 A | 4/1994 | Heavey | |
| 5,691,623 A * | 11/1997 | Tsantilis | 320/155 |
| 6,608,469 B2 * | 8/2003 | Fukuoka et al. | 320/134 |
| 7,583,053 B2 * | 9/2009 | Kamohara | 320/106 |
| 8,269,463 B2 * | 9/2012 | Nakashima et al. | 320/132 |
| 8,332,169 B2 * | 12/2012 | Kang et al. | 702/63 |
| 8,741,459 B2 * | 6/2014 | Okumura et al. | 429/90 |
| 2002/0011822 A1 * | 1/2002 | Sakai et al. | 320/134 |
| 2003/0020434 A1 * | 1/2003 | Fukuoka et al. | 320/134 |
| 2003/0178970 A1 * | 9/2003 | Minamiura et al. | 320/116 |

(Continued)

FOREIGN PATENT DOCUMENTS

JP 4052080 B2 4/2004

OTHER PUBLICATIONS

Extended European Search Report dated Oct. 29, 2012 (six (6) pages).

*Primary Examiner* — Phallaka Kik
(74) *Attorney, Agent, or Firm* — Crowell & Moring LLP

(57) ABSTRACT

Since in existent charge-discharge control the battery direct current resistance of a lithium ion battery increases at a low temperature or in a low SOC, the battery voltage may possibly exceed greatly the maximum allowable voltage instantaneously due to over-voltage during charging or may possibly decrease greatly to less than the minimum allowable voltage during discharging. If the lithium ion battery continuously lies in such a state the battery performance is degraded abruptly.
The battery resistance of a lithium ion battery module is estimated in accordance with SOC and temperature of the lithium ion battery module, and current to charge is set properly based on the estimated battery resistance.

9 Claims, 3 Drawing Sheets

(56) References Cited

U.S. PATENT DOCUMENTS

| | | |
|---|---|---|
| 2004/0070353 A1 | 4/2004 | Kayukawa et al. |
| 2004/0119441 A1* | 6/2004 | Koo .................... 320/104 |
| 2004/0164706 A1* | 8/2004 | Osborne ................ 320/116 |
| 2006/0076929 A1* | 4/2006 | Tatsumi et al. ........ 320/132 |
| 2006/0113959 A1* | 6/2006 | Honma ................. 320/128 |
| 2007/0013347 A1* | 1/2007 | Kamohara ............. 320/160 |
| 2007/0145948 A1* | 6/2007 | Lim et al. ............. 320/132 |
| 2009/0130541 A1* | 5/2009 | Emori et al. ........... 429/61 |
| 2010/0116570 A1* | 5/2010 | Sugawara et al. ...... 180/65.1 |
| 2010/0185405 A1 | 7/2010 | Aoshima et al. |
| 2010/0244847 A1* | 9/2010 | Kudo et al. ........... 324/433 |
| 2010/0247988 A1* | 9/2010 | Okumura et al. ...... 429/90 |
| 2010/0253285 A1* | 10/2010 | Takahashi et al. ..... 320/118 |
| 2011/0001456 A1* | 1/2011 | Wang .................. 320/117 |
| 2011/0254559 A1* | 10/2011 | Nakashima et al. .... 324/427 |
| 2012/0091965 A1* | 4/2012 | Seo et al. ............. 320/128 |
| 2013/0187659 A1* | 7/2013 | Kubo et al. ........... 324/433 |
| 2014/0159739 A1* | 6/2014 | Kudo et al. ........... 324/434 |

* cited by examiner

FIG. 4

| TEMPERATURE (°C) | SOC(%) | | | | | | | | | | |
|---|---|---|---|---|---|---|---|---|---|---|---|
| | 0 | 10 | 20 | 30 | 40 | 50 | 60 | 70 | 80 | 90 | 100 |
| -30 | ** | ** | ** | ** | ** | ** | ** | ** | ** | ** | ** |
| | ** | ** | ** | ** | ** | ** | ** | ** | ** | ** | ** |
| -20 | ** | ** | ** | ** | ** | ** | ** | ** | ** | ** | ** |
| | ** | ** | ** | ** | ** | ** | ** | ** | ** | ** | ** |
| -10 | ** | ** | ** | ** | ** | ** | ** | ** | ** | ** | ** |
| | ** | ** | ** | ** | ** | ** | ** | ** | ** | ** | ** |
| 0 | * | * | * | * | * | * | * | * | * | * | * |
| 10 | 6mΩ | 6mΩ | 6mΩ | 5mΩ | 5mΩ | 5mΩ | 5mΩ | 4mΩ | 4mΩ | 4mΩ | 4mΩ |
| 30 | * | * | * | * | * | * | * | * | * | * | * |
| 50 | | | | | | | | | | | |

SECONDARY BATTERY SYSTEM

BACKGROUND OF THE INVENTION

1. Field of the Invention

The present invention relates to a battery system using non-aqueous secondary batteries typically represented by lithium ion batteries, a battery device having the battery system mounted thereon, and a battery system-mounted vehicle.

2. Description of the Related Art

In recent years, lithium ion batteries have been utilized as a driving power supply for vehicles such as hybrid cars and electric cars and portable electronic devices such as notebook personal computers and digital cameras.

Degradation phenomena occur in such a battery system using lithium ion batteries. Due to repeated charge-discharge cycles, the battery capacity is lowered and the direct current resistance of the battery is increased, resulting in degradation phenomena. The degradation phenomena likely occur in charge-discharge cycles under the condition of large current and large capacity. For example, the degradation phenomena means that the capacity of insertable lithium ions to positive or negative electrode materials decreases and thereby battery performance lowers. Therefore, charging or discharging to a lithium ion battery is controlled such that the state of charge (SOC) of the battery falls within a predetermined range. Japanese Patent No. 4052080 discloses a control device that judges the state as overcharge when the voltage of a lithium ion battery exceeds a maximum allowable voltage and judges the state as over-discharge when the voltage is lower than the minimum allowable voltage, thereby stopping charging or discharging.

SUMMARY OF THE INVENTION

However, if such a charge-discharge control is employed, the battery direct current resistance increases when the lithium ion battery is at a low temperature or in a low SOC. Thus the voltage may instantaneously exceed the maximum allowable voltage greatly due to over voltage during charging, whereas the voltage may be greatly made lower than the minimum allowable voltage during discharging. If such a state continues for the lithium ion battery, then the battery performance will lower abruptly.

Further, as long as the upper and lower limit values of the charge and discharge current to charge and discharge and voltage are set by detecting the temperature of the lithium ion battery, the battery cannot be charged to the maximum allowable voltage higher than a restriction value. Further, if such control method is used, the voltage of the lithium ion battery may instantaneously exceed the maximum allowable voltage when the lithium ion battery is in the low SOC or at a low temperature, with the result that the battery performance may abruptly lower.

The present invention has been achieved based on such a finding and intends to provide a secondary battery system capable of suppressing lowering of the battery capacity and increase in the battery direct current resistance by properly controlling a value of current to charge and a charging time to a lithium ion battery. Further, the invention provides a battery device having the secondary battery system mounted thereon and a vehicle mounting the secondary battery system.

According to the invention, a battery resistance of a lithium ion battery module is estimated in accordance with SOC and temperature of the lithium ion battery module and current to charge is set properly based on the estimated battery resistance.

When the lithium ion battery module is charged, the battery resistance of the lithium ion battery module is estimated in accordance with the SOC and the temperature of the lithium ion battery module and the current to charge is properly set. Thus since the voltage does not instantaneously exceed the maximum allowable voltage due to over voltage, improvement in the life of the lithium ion battery can be expected.

BRIEF DESCRIPTION OF THE DRAWINGS

Other objects and advantages of the invention will become apparent from the following description of embodiments with reference to the accompanying drawings in which:

FIG. 4 is a correlation table of battery resistance of a non-aqueous secondary battery.

DESCRIPTION OF THE PREFERRED EMBODIMENT

Then, an embodiment of the invention will be described with reference to the drawings.

Figure 1:
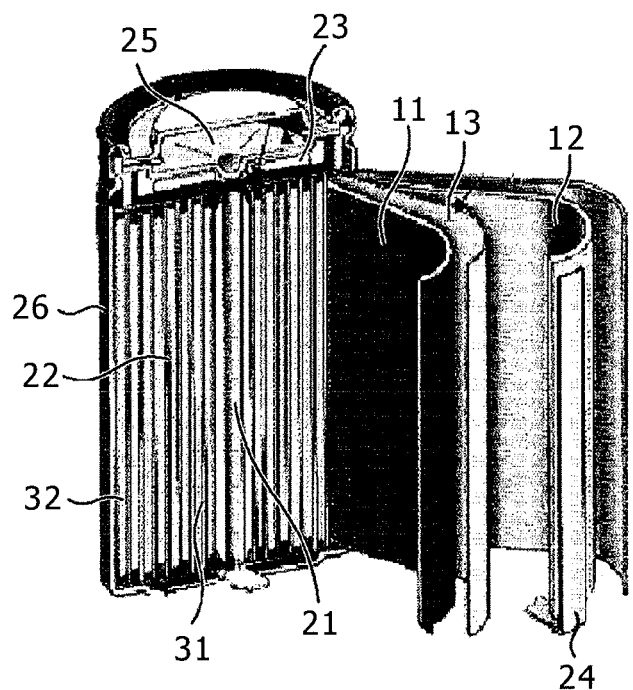
FIG. 1 is a partially cut-away perspective view of a cylindrical non-aqueous secondary battery.

FIG. 1 shows a non-aqueous secondary battery used in the invention (hereinafter also referred to simply as a battery or a lithium ion battery). A positive electrode plate 11 comprises a composite lithium oxide as an active material. A negative electrode plate 12 comprises a lithium ion retaining material as an active material. The positive electrode plate 11 and the negative electrode plate 12 are spirally wound by way of a separator 13 to provide a rolled-up electrode unit 22. Then the rolled-up electrode unit 22 is contained inside a bottomed cylindrical battery can 26. A negative electrode tab 24 led out from the lower part of the rolled-up electrode unit 22 is welded to the bottom of the battery can 26 and then a positive electrode tab 23 led out from the upper part of the rolled-up electrode unit 22 is welded to a battery cap 25. A predetermined electrolyte is poured into the battery can 26, and the battery cap 25 having an insulating gasket (not illustrated) at the periphery is attached and caulked to the opening of the battery can 26. The side of the axis of winding 21 is defined as an inner circumferential side 31 and the outside thereof is defined as an outer peripheral part 32.

The positive electrode active material coated on the positive electrode plate 11 includes, for example, lithium cobaltate and modified products thereof (products formed by solid solubilizing aluminum or magnesium into lithium cobaltate), lithium nichelate and modified products thereof (products formed by partially substituting cobalt for nickel), lithium manganate and modified products thereof, and composite oxides thereof (containing nickel, cobalt, manganese).

As a conductive agent, carbon blacks such as acetylene black, ketjen black, channel black, furnace black, lamp black, and thermal black, and various kinds of graphites can be used each alone or in combination.

As the binder for the positive electrode, polyvinylidene fluoride (PVdF), modified product of polyvinylidene fluoride, polytetrafluoroethylene (PTFE), and particulate rubber binder comprising acrylate units can be used, in which an acrylate monomer or an acrylate oligomer introduced with a reactive functional group can also be incorporated in the binder.

Then, as the negative electrode active material coated on the negative electrode plate 12, various kinds of natural graphites, artificial graphites, silicone type composite materials such as silicides, and various kinds of metal plastic materials can be used.

As the binder for the negative electrode, while PVdF and modified products thereof, as well as various kinds of binders can be used, it is more preferred to use styrene-butadiene copolymer rubber particles (SBR) and modified products thereof in combination with or with addition of a small amount of cellulose type resins such as carboxymethyl cellulose (CMC).

As the conductive agent, carbon blacks such as acetylene black, ketjen black, channel black, furnace black, lamp black, and thermal black, and various kinds of graphites can be used, for example, each alone or in combination.

The separator is not restricted particularly so long as the separator has a composition endurable within the range of use of the lithium ion secondary battery. A microporous film comprising an olefinic resin, for example, polyethylene or polypropylene may be used for the separator generally and preferably each alone or in a composite manner. The thickness of the separator is not particularly restricted and is preferably from 10 to 40 μm.

For the electrolyte, various kinds of lithium compounds such as $LiPF_6$ and $LiBF_4$ can be used as an electrolyte salt. Further as the solvent, ethylene carbonate (EC), dimethyl carbonate (DMC), diethyl carbonate (DEC), and methyl ethyl carbonate (MEC) can be used each alone or in combination. Further, vinylene carbonate (VC), cyclohexyl benzene (CHB), and modified products thereof are used preferably to form a satisfactory film on the positive electrode and the negative electrode, thereby ensuring the stability upon overcharging or over-discharging.

The shape of the rolled-up electrode unit in the invention is not necessarily be a normal cylindrical shape but may also be a shape such as length cylindrical shape having an elliptic rolled-up cross section or a quadrangular shape having a rectangular rolled-up cross section. A typical mode of use is as follows preferably. The rolled-up electrode unit and the electrolyte are filled in a bottomed cylindrical battery can and sealed in a state in which a tab for taking out current from the electrode plate is welded to the cap and the battery can. However, the present invention is not limited to such a mode.

The battery can for filling the rolled-up electrode unit is not particularly restricted and those exhibiting the good performance in strength, corrosion resistance, and machinability such as a battery can plated on iron or stainless steel battery are preferred to provide corrosion resistance. Further, for the battery can, aluminum alloys or various kinds of engineering plastics can be used for reduction in weight and various kinds of engineering plastics and metals can be used in combination.

Figure 2:
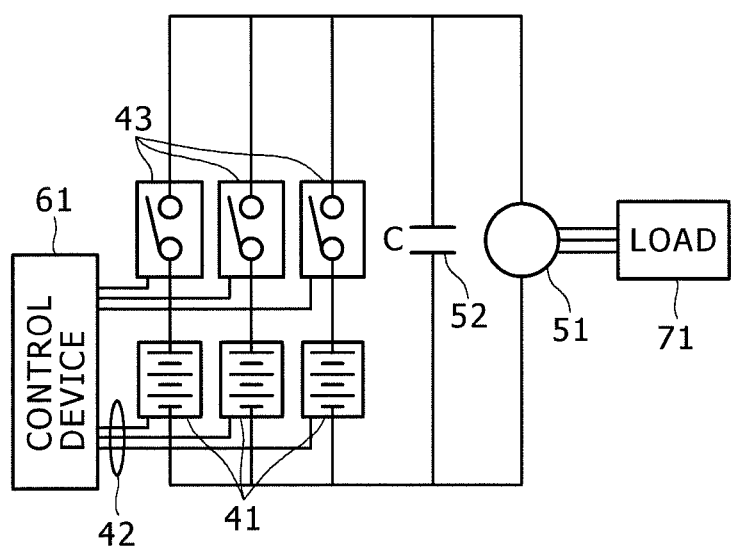
FIG. 2 is a schematic configurational view of a secondary battery system.

Then, FIG. 2 shows a secondary battery system. A lithium ion battery module 41 comprises a plurality of the batteries described above assembled in series, parallel, or serial-parallel connection. To detect the state of the lithium ion battery module battery 41, the secondary battery system is provided with a control device (entire controller) 61. The control device 61 has a battery state detection device for detecting battery voltage, charge and discharge current, and battery surface temperature of the lithium ion battery module 41 (measuring device) 42. Further, the control device 61 calculates electric resistance, quantity of cumulative charge/discharge electricity, and cumulative operation time based on the detected values.

The battery resistance Z of the lithium ion battery module 41 can be represents by the formula (1) assuming a terminal voltage as V, an open voltage as $V_0$ and a current as I of the lithium ion battery module 41. In the formula (1), the discharge side is defined as "+". Further, the formula (2) is derived from the formula (1) and the battery resistance Z can be calculated.

$$V = V_0 - I \times Z \quad (1)$$

$$Z = (V_0 - V)/I \quad (2)$$

Further, the lithium ion battery module 41 and power switching devices 43 are combined in series, and the control device 61 transmits a control signal by way of a control signal transmission device 44 to the power switching device 43 in accordance with a detected value obtained from the battery state detection device 42 of the lithium ion battery module 41 and the amount of a demanded power from an electric load 71.

The control device 61 includes a microcomputer having CPU, ROM, and RAM and operated in accordance with a predetermined program. Then, the control device 61 controls charging and discharging to the lithium ion battery module 41 based on the detected value obtained from the battery state detection device 42.

A voltage detection means as the battery state detection device 42 detects the voltage on the lithium ion battery module. The battery voltage to be detected conceivably includes the voltage on one of batteries constituting the lithium ion battery module 41, the voltage on a battery group comprising a plurality of batteries connected in series, or the voltage on assembled batteries comprising a plurality of batteries in serial and parallel connection, but it is not particularly restricted.

Then, a current detection device detects the value of charge and discharge current. While instruments used in the detection method conceivably include a galvanometer, a galvanometer using a shunt resistor, and a clamp meter, they are not restrictive but any of means capable of detecting current values can be used.

Then, a temperature detection device detects the temperature of the lithium ion battery module 41. While devices for detecting temperature conceivably include a thermocouple, a thermister, etc., they are not restricted particularly. Examples of the place where temperature is to be detected includes the surface of the battery, the inside of the battery, the surface of a casing containing the lithium ion battery, and the environment of the lithium ion battery module 41.

While the power switching device 43 may include, for example, a semiconductor switch, a mechanical switch, an inverter or a DC-DC converter as power conversion equipment, etc., the power switching device 43 are not limited thereto and any of devices capable of controlling the current value upon charging and discharging to the lithium ion battery module 41 may be used.

The power conversion device 51 is a device which converts a DC current obtained from the lithium ion battery into an AC current in response to the load. Usually, an inverter is preferably used as the power conversion device 51. A capacitor 52 is connected in parallel with the power conversion device 51. Even if power supply to the power conversion device 51 is reduced to 0 instantaneously, current is discharged from the capacitor 52, thereby allowing stable power to be supplied to the power converter 51.

The electric load 71 may be a heater, an electric brake, an electric power steering, or an electric motor, for example, in the use to an automobile.

Figure 3:
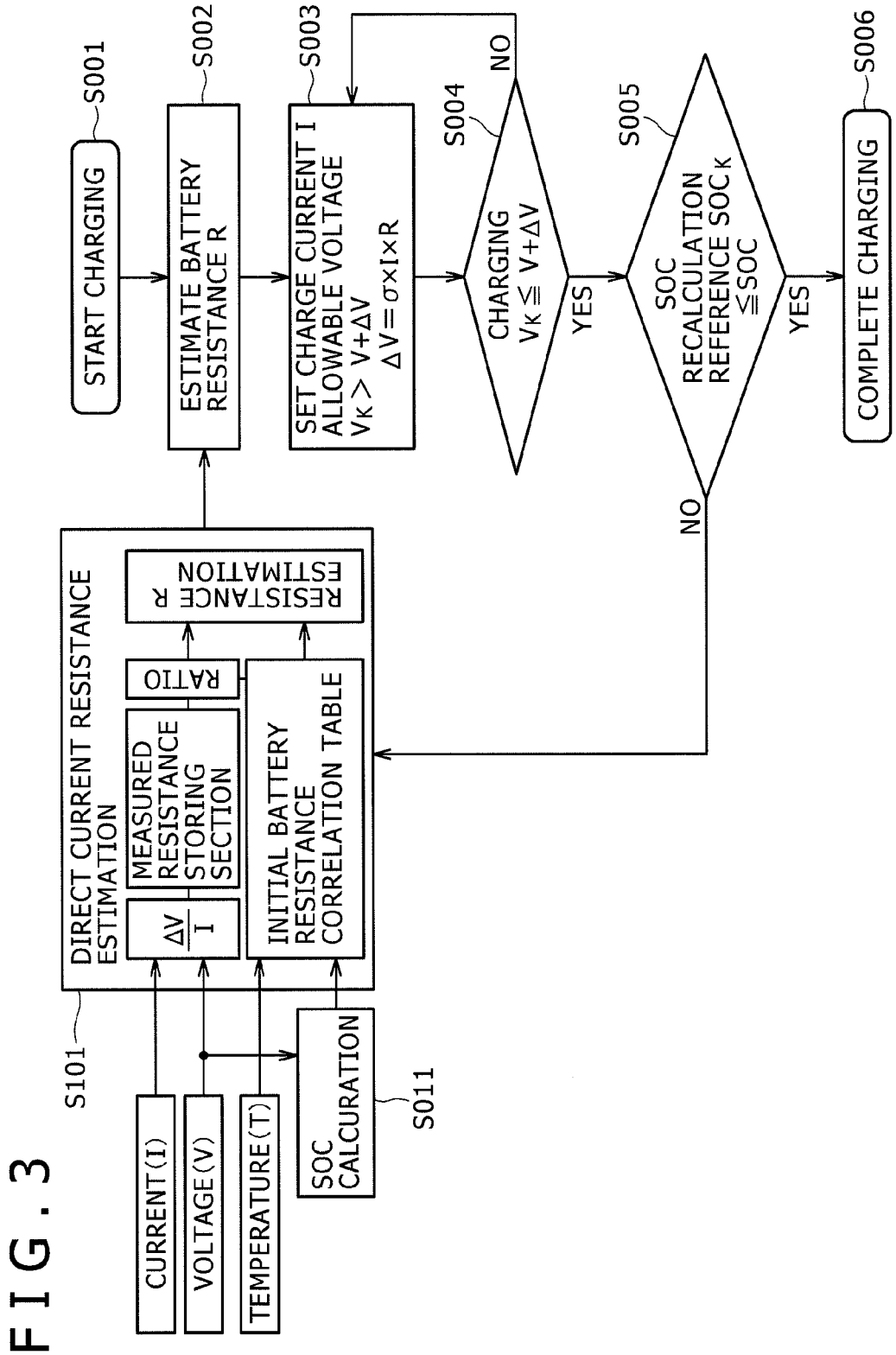
FIG. 3 is a system flow chart of a secondary battery system.

Then, the charge-discharge control method by the control device 61 will be described. FIG. 3 is a flow chart of a secondary battery system according to this embodiment.

First, at the starting step S001, an instruction for starting charging to the lithium ion battery module 41 is sent as a signal from the control device 61 to the lithium ion battery module 41 to be charged.

At the step S002, the battery resistance R of the lithium ion battery module 41 is estimated. Details as to how to estimate will be described in the step S101.

At the step S101, a battery resistance R just before charging is estimated. More specifically, a battery resistance R' in a standard state is first calculated periodically, for example, upon maintenance of the lithium ion battery module 41. The calculation method is shown by the formula (2). While the standard state is not particularly restricted, SOC of 50% and temperature of 30° C., i.e., such conditions that the degradation of the lithium ion battery does not develop as much as possible, are desirable.

Then, the control device 61 retrieves an initial battery resistance $R_0'$ in a standard state calculated under the same conditions of SOC and temperature as those in the standard state from a previously stored initial battery resistance correlation table (FIG. 4). Then, the ratio α is calculated according to the formula (3) based on the two resistance values.

$$\alpha = (R'/R_0') \qquad (3)$$

Then, an inter-terminal voltage V and a battery temperature T of the lithium ion battery module 41 are detected by the battery state detection device 42 in FIG. 2 and SOC is calculated based on the inter-terminal voltage of the lithium ion battery module 41 at the step S011. Then, the initial battery resistance $R_0$ corresponding to the current SOC and battery temperature is retrieved from the initial battery resistance correlation table in FIG. 4.

Then, the current battery resistance R of the lithium ion battery module 41 is estimated according to the formula (4).

$$R = \alpha \times R_0 \qquad (4)$$

At the step S003, charge current I to charge is represented by the formula (5) assuming the inter-terminal voltage as V, the maximum allowable voltage as $V_k$, and the estimated battery resistance as R for the lithium ion battery module 41. σ is an adjusting value, for which variations between batteries (standard deviation, etc.) may be used but is not particularly restricted. After setting the charge current I, the flow proceeds to the step S004.

The charge current I is set repeatedly. The newly set value of charge current I is smaller than the previously set value.

$$I \leq (V_k - V)/(\sigma \times R) \qquad (5)$$

At the step S004, the lithium ion battery module 41 is charged. When the inter-terminal voltage of the lithium ion battery module 41 reaches a maximum allowable voltage $V_K$, charging is stopped and a charge stop signal is sent to the control device 61. Then, the flow proceeds to the step S005. When the inter-terminal voltage V of the lithium ion battery module 41 is lower than the maximum allowable voltage $V_k$, charging is continued.

At the step S005, SOC of the lithium ion battery module 41 is calculated again. When the calculated SOC exceeds a predetermined standard $SOC_k$, the flow proceeds to the step S006, at which charging is completed. When the calculated SOC is not higher than the predetermined standard $SOC_k$, the flow proceeds to the step S101, at which the battery resistance R of the lithium ion battery module 41 is calculated again.

As described above, according to this embodiment, the lithium ion battery module 41 can be charged by the control of detecting the state of the battery of the lithium ion battery module 41 by the battery state detection device 42, estimating the battery resistance R of the lithium battery module 41 based on the detected value and the initial battery resistance correlation table, and setting the charge current I, wherein the maximum allowable voltage is not reached due to over voltage. Accordingly, lowering of the battery capacity and increase in the battery resistance of the lithium ion battery can be suppressed, thereby providing a long life secondary battery system.

The present invention is not restricted to the embodiment described above and is applicable to other embodiments with appropriate modification within a range not departing from the gist of the invention.

For example, while the rolled-up type lithium ion battery is used as the battery in the embodiment described above, the invention is applicable also to a stacked type lithium ion battery where a plurality of positive electrode plates and a plurality of negative electrode plates are stacked alternately by way of separators respectively.

What is claimed is:

1. A secondary battery system comprising:
   a battery module having at least one lithium ion battery;
   a measuring device for measuring a voltage and a temperature of the battery module;
   a state of charge detection device for detecting a state of charge based on the voltage; and
   a charge-discharge control device;
   wherein an estimated battery resistance of the battery module, corresponding to the state of charge and the temperature of the battery module, is calculated by the charge-discharge control device based on a standard battery resistance, a standard initial battery resistance, and a measured initial battery resistance;
   the standard battery resistance is calculated based on a standard operating condition of the battery module;
   the standard initial battery resistance is calculated based on a standard initial condition of the battery module;
   the measured initial battery resistance is calculated based on a measured initial condition of the battery module; and
   the charge-discharge control device calculates the estimated battery resistance using a formula R=[(R'×R0)/R0'];
   wherein R is the estimated battery resistance, R' is the standard battery resistance, R0' is the standard initial battery resistance, and R0 is the measured initial battery resistance.

2. The secondary battery system of claim 1, wherein the standard battery resistance is calculated based on a voltage and a current through the battery module during the standard operating condition.

3. The secondary battery system of claim 2, wherein the standard initial battery resistance and the measured initial battery resistance are determined based on data stored in a storage device,
   wherein the data include the voltage and the temperature.

4. The secondary battery system of claim 3, wherein the charge-discharge control device sets a current to supply to the battery module based on the estimated battery resistance.

5. The secondary battery system of claim 4, wherein the charge-discharge control device stops supplying the current to the battery module if the voltage exceeds a predetermined value.

6. The secondary battery system of claim 5, wherein the charge-discharge control device reinitiates the current supplied to the battery module, when the state of charge is less than or equal to a threshold value.

7. The secondary battery system of claim 6, wherein the estimated battery resistance is updated when the charge-discharge control device reinitiates the current supplied to the battery module.

8. The secondary battery system of claim 1, wherein the standard operating condition is a condition in which the battery module does not degrade excessively.

9. An control method for a secondary battery system with a battery module having at least one lithium ion battery, comprising:

measuring a voltage and a temperature of the battery module;

detecting a state of charge based on the voltage;

calculating, by a control device, an estimated battery resistance of the battery module, corresponding to the state of charge and the temperature of the battery module, based on a standard battery resistance, a standard initial battery resistance, and a measured initial battery resistance; and controlling, by the control device, a charge current for charging the battery module based on the estimated battery resistance; wherein the standard battery resistance is calculated based on a standard operating condition of the battery module;

the standard initial battery resistance is calculated based on a standard initial condition of the battery module;

the measured initial battery resistance is calculated based on a measured initial condition of the battery module; and the charge-discharge control device calculates the estimated battery resistance using a formula $R=[(R'\times R0)/R0']$;

wherein R is the estimated battery resistance, R' is the standard battery resistance, R0' is the standard initial battery resistance, and R0 is the measured initial battery resistance.

* * * * *